(12) United States Patent
Waltz et al.

(10) Patent No.: US 6,199,935 B1
(45) Date of Patent: Mar. 13, 2001

(54) FLEXIBLE SHEET COVER APPARATUS

(76) Inventors: Paul Waltz, R.R. 1, Box 393, Washington, IN (US) 47501; Kevin Waltz, 5249 E. 9$^{th}$ St., Indianapolis, IN (US) 46219

( * ) Notice: Subject to any disclaimer, the term of this patent is extended or adjusted under 35 U.S.C. 154(b) by 0 days.

(21) Appl. No.: 09/370,467

(22) Filed: Aug. 9, 1999

(51) Int. Cl.$^7$ ..................................................... B60P 7/04

(52) U.S. Cl. ........................................ 296/98; 296/100.14

(58) Field of Search ............................... 296/98, 100.11, 296/100.14

(56) References Cited

U.S. PATENT DOCUMENTS

| | | | |
|---|---|---|---|
| 4,834,445 | * | 5/1989 | Odegaard ............................... 296/98 |
| 4,893,864 | * | 1/1990 | Bailey ..................................... 296/98 |
| 5,002,328 | * | 3/1991 | Michel .................................... 296/98 |
| 5,275,459 | * | 1/1994 | Haddad, Jr. ........................ 296/98 X |
| 5,328,228 | * | 7/1994 | Klassen ................................... 296/98 |

FOREIGN PATENT DOCUMENTS

| | | | |
|---|---|---|---|
| 1098840 | * | 6/1984 | (SU) ...................................... 296/98 |
| 2523527 | * | 6/1984 | (FR) ...................................... 296/98 |

* cited by examiner

Primary Examiner—Joseph D. Pape
(74) Attorney, Agent, or Firm—Locke Reynolds LLP

(57) ABSTRACT

A load-carrying box on a land vehicle in the form of a generally rectangular container having an upper perimeter defined by a top edge of each of the walls encompassing an open top is covered by a flexible sheet cover having a first end secured adjacent a top edge of one of the side walls. A second end of the flexible sheet is attached to a roller having opposite ends projecting beyond the top edges of two end walls forming the load-carrying box. A motor is coupled to the roller for rolling and unrolling the flexible sheet cover along the top edges of the two end walls and along bows connecting the two side walls. An arm has a first end coupled to the roller and a second end including a slot engaging a pin defining a pivot for the arm so that the roller can remain in constant contact with the top edges of the end walls and bows as the flexible sheet cover is deployed and retrieved. The arm is in the form of a box beam of fixed length having an outer member, an inner member confronting the load-carrying box, and side joining members joining the outer member to the inner member, the inner member including the pivot slot. The motor is fixed to the arm between the roller and the slot, and a drive unit couples the motor to the roller, the drive unit being enclosed within the box beam.

20 Claims, 5 Drawing Sheets

FLEXIBLE SHEET COVER APPARATUS

BACKGROUND OF THE INVENTION

The present invention is directed generally to flexible covers for open top load-carrying boxes on land vehicles, and more specifically to power driven apparatus for deploying and retrieving such flexible covers over the open top of the load-carrying boxes. The invention has special utility in connection with trucks and trailers used to carry loads of particulate materials such as grain, feed, coal, gravel, and the like.

A variety of apparatus for applying flexible covers is known from the prior art. For example, Michel, U.S. Pat. No. 5,002,328, discloses a motorized drive system for covering and uncovering the top of an open truck box. A lateral edge of the flexible cover is fixed to one side of the box while the other lateral edge is attached to a roll tube. A reversible rotary motor rotates the roll tube to either remove the cover from the top of the box or to deploy the cover over the box. The position of the roll tube is, in part, controlled by an extensible arm and, in part, by a cable return mechanism adapted to apply a constant tension during the winding and unwinding of the cover over the tube.

Tsukamoto, U.S. Pat. No. 4,673,208, discloses a similar power operated cover roller mechanism involving pivotally mounted levers and a special chain and sprocket arrangement to secure the cover over the truck bed. The power is supplied to the pivotally mounted levers through power cylinders 19 and 20 coupled to the pivotally mounted levers. Klassen, U.S. Pat. No. 5,328,228, discloses yet another pivotally mounted lever assembly for rolling a cover over a truck bed and cargo. The roller is moved through a series of pulleys by virtue of a motor affixed to one side of the truck body.

Odegaard, U.S. Pat. No. 4,834,445, discloses yet another cover deployment apparatus carried by an arm which is itself pivoted to another arm coupled to one side of the container body. The motor operating the roller carrying the flexible cover is disposed at the very end of the first arm and spring tension members are employed to urge the first arm toward the fully deployed position. Fredin, U.S. Pat. No. 4,225,175 discloses yet another similar arrangement for applying a flexible cover over a container using a pivoted arm moved by a power cylinder 9.

Wilkens, U.S. Pat. No. 5,765,901, discloses a similar roll-up assembly in which a hand crank rather than a motor is employed. The hand crank is designed to be secured to the trailer on either side depending upon whether the cover is in the open or closed position. Another hand crank system is shown in Harris et al., U.S. Pat. No. 5,466,030 which exposes or covers one side of a freight container rather than an open top.

Haddad, Jr., U.S. Pat. No. 5,275,459, discloses a cover deployment mechanism for use on a trailer wherein an arm is provided on each side of the trailer, the two arms having a tie rod between them to which the flexible cover is attached. Each of the two arms include an electrically insulating spacer so that in the event of an inadvertent contact with an overhead power line, such contact should not damage any portion of the mechanism. Somewhat similar mechanisms are shown in Bailey, U.S. Pat. No. 4,893,864, and Cappello, U.S. Pat. No. 3,549,198. A double cover arrangement deployed in a similar manner is shown in Haddad, Jr., U.S. Pat. No. 5,573,295.

Despite this variety of apparatus for applying flexible covers in the prior art, a need still exists for a reliable mechanism capable of covering a load without binding using a power mechanism that can be controlled from the cab of the vehicle. It is of particular interest to have such a mechanism that can accommodate a wide variety of trucks and trailers that may have upper perimeters of varying shape and curvature.

SUMMARY OF THE INVENTION

A flexible sheet cover apparatus in accordance with the present invention is used in conjunction with a load-carrying box on a land vehicle. The box generally has a floor, a pair of parallel side walls extending upward from the floor, a front wall and a back wall also extending upward from the floor. The front and back walls are coupled to the pair of side walls to form a generally rectangular container, the container having an upper perimeter defined by a top edge of each of the walls encompassing an open top. A flexible sheet cover has a first end secured adjacent a top edge of one of the walls and a second end attached to a roller. The roller has opposite ends projecting beyond the top edges of a selected two non-contiguous walls forming the load-carrying box such as the front and back walls. A motor is coupled to the roller for rolling and unrolling the flexible sheet cover. An arm has a first end coupled to the roller and a second end including a slot. A pin is coupled to the load-carrying box and engaged in the slot to define a pivot for the arm so that the roller can remain in constant contact with the top edges of the selected two non-contiguous walls forming the load-carrying box as the flexible sheet cover is rolled on and off the open top.

The arm preferably comprises a box beam of fixed length having an outer member, an inner member confronting the load-carrying box, and side joining members joining the outer member to the inner member, the inner member including the slot engaging the pivot pin. The motor is preferably fixed to the arm between the roller and the slot. A drive unit couples the motor to the roller, the drive unit being enclosed within the box beam. The drive unit preferably comprises a first pulley coupled to the motor, a second pulley coupled to the roller. An endless band such as a belt or chain couples the first and second pulleys together for substantially coordinated movement.

In one embodiment of the present invention, a bracket is fixed to the load-carrying box to connect to the arm. The bracket includes a lateral slot receiving the pin to provide for lateral movement of the pivot point for the arm. In one embodiment of the present invention a biasing spring is included that has a first end fixed to the arm and a second end fixed to the load-carrying box. The biasing spring promotes contact between the roller and the top edges of the selected two non-contiguous walls forming the load-carrying box. In the preferred embodiment the selected two non-contiguous walls forming the load-carrying box constitute the front wall and the back wall. In that embodiment the load-carrying box can also include a plurality of bows coupling the tops of the two side walls together, the bows being generally parallel with the top edges of the front and back walls.

One feature of the present invention is a sliding pivot provided by a pin member engaged in a slot in a lower portion of the arm that provides for a continuous contact between the rolled portion of the flexible sheet cover and the top edges of the two non-contiguous walls supporting the roller as the flexible sheet cover is deployed and retrieved. This feature can be used with either a fixed position pivot pin or with a laterally movable pivot pin engaged in a lateral slot in a bracket attached to a wall of the load-carrying box.

Another feature of the present invention is a pivoted arm having a box beam construction of sufficiently large crosssection to contain a drive mechanism for transferring power to the roller connected at the upper end of the arm from a motor connected to the arm at a much lower position. The construction permits the motor to be fixed to the arm at a low center of gravity position rather than be directly coupled to the roller at the upper end of the arm. The box beam constructions also contributes to the strength of the arm to support the roller and flexible sheet cover while retaining light weight to minimize the torque requirements on the motor.

Additional features and advantages of the present invention will become apparent to those skilled in the art upon consideration of the following description of preferred embodiments that references the accompanying drawings.

DESCRIPTION OF PREFERRED EMBODIMENTS

Figure 1:
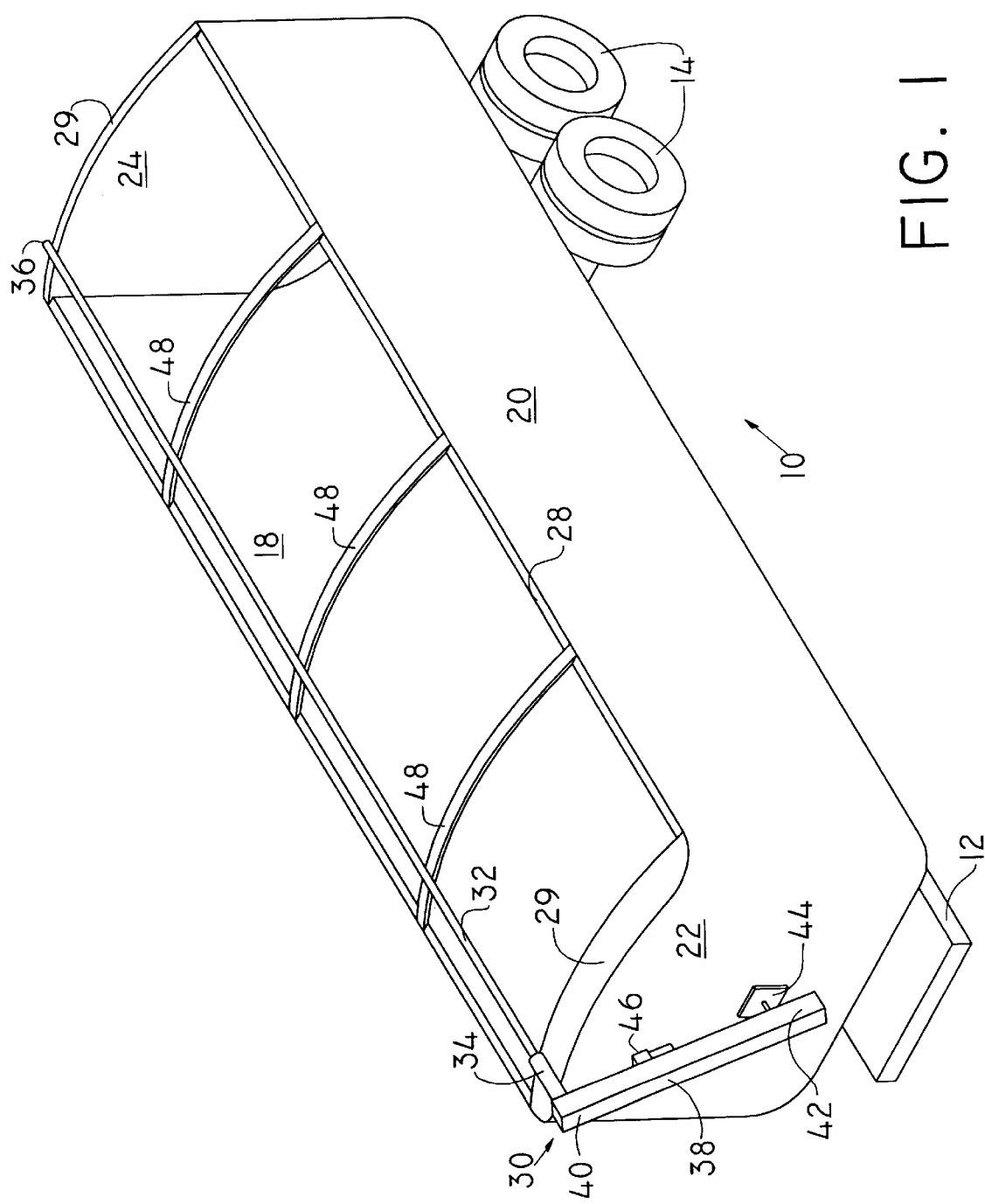
FIG. 1 is a perspective view of a trailer incorporating a flexible sheet cover apparatus of a first embodiment of the present invention.

A trailer 10 is shown to include, generally, an undercarriage 12 that includes a set of wheels 14 for transporting the trailer over land. A forward portion of the undercarriage 12 would generally include a king pin (not shown) for coupling the trailer to a suitable tractor or truck (also not shown). Additionally, the trailer includes a load carrying box 16 defined by a floor, a pair of parallel side walls 18 and 20, a front wall 22 and a back wall 24. The walls 18–24 form a generally rectangular container 26 having an upper perimeter 28 defined by the top edge 29 of each of the walls 18–24. Apparatus 30 for moving a flexible sheet cover with respect to the load carrying box 26 is shown coupled to the front wall 22. The apparatus 30 includes a roller 32 having a front end 34 and a back end 36. The ends 34 and 36 project beyond the inner surface of the end walls 22 and 24 so that the ends of roller 32 can contact the top edge 29 of the end walls. The front end 34 of roller 32 is coupled to the upper end 40 of arm 38. A lower end 42 of arm 38 is coupled to a pivot pin 44 which, in FIG. 1, is shown to be fixed to front wall 22 of trailer 10. The arm 38 carries a motor 46 which is coupled to the front end 34 of roller 32 by a drive mechanism located inside the arm 38.

Figure 2:
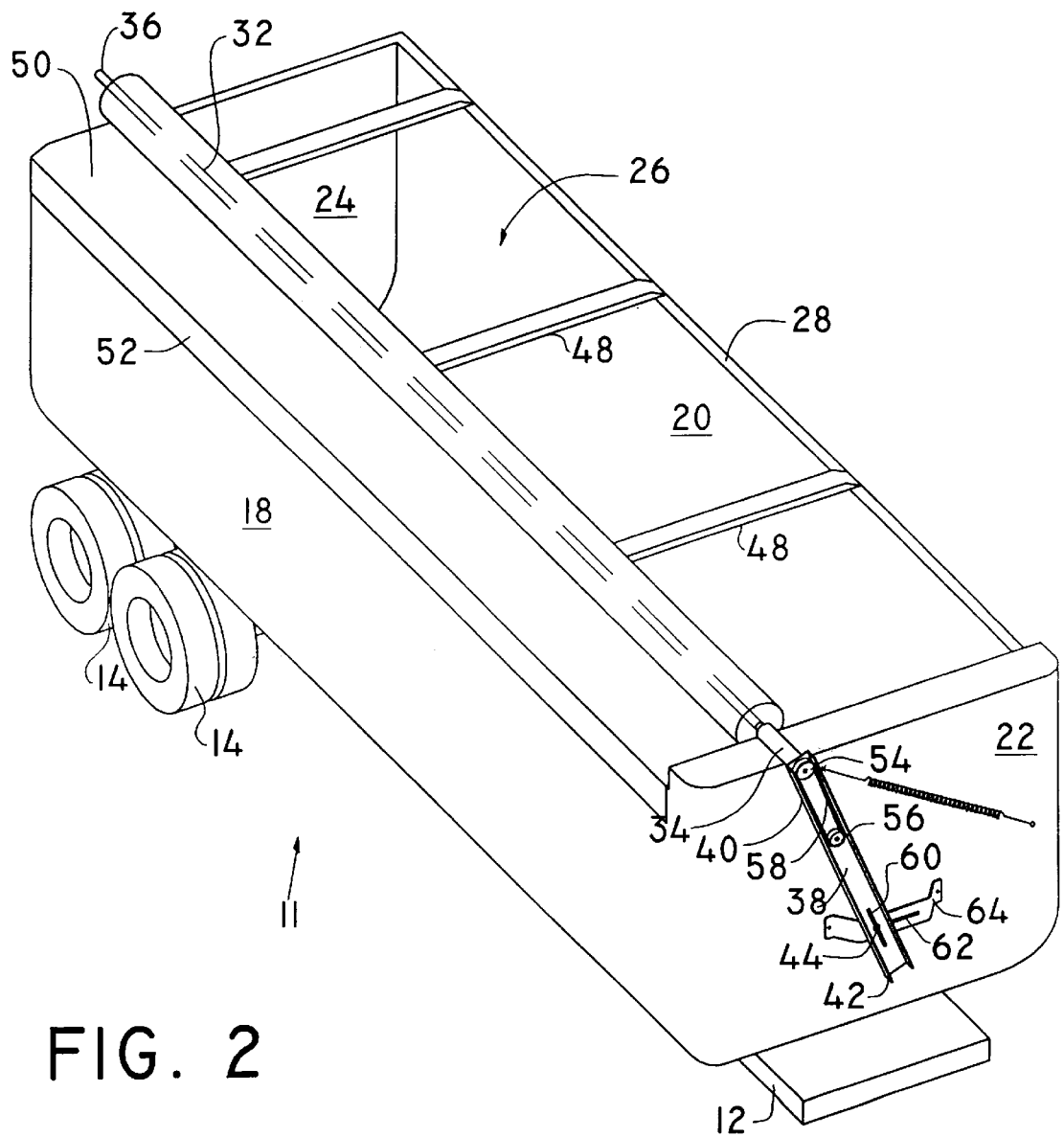
FIG. 2 is perspective view of another trailer incorporating a second embodiment of a flexible sheet cover apparatus of the present invention.

FIG. 2 shows another trailer 11 having a structure similar to trailer 10 in which the identical parts are numbered identically. It is to be noted that in FIG. 2, a flexible cover 50 is rolled up around roller 32. The flexible cover 50 has one lateral edge 52 which is fixed to side 18 of trailer 11. This same structure would also be present in trailer 10 of FIG. 1, but has been omitted for clarity to show the roller 32 itself absent the flexible sheet cover 50. In FIG. 2, it will be noted that the arm 38 is a hollow box-like structure. For clarity, a front wall of the box beam forming the arm 38 has been removed to permit the illustration of the contents of the box beam. A upper pulley 54 is shown to be coupled to the front end 34 of roller 32 while another pulley 56 is shown to be coupled to motor 46. A belt or chain 58 couples pulleys 54 and 56 together so that power from the motor 46 is transmitted to the roller 32.

The lower end 42 of arm 38 is shown to include a slot 60 on an inner wall. In trailer 10, this slot 60 engages pin 44 so that the arm 38 can slide longitudinally or radially as necessary with respect to pin 44 to maintain contact between the roller 32 and flexible cover 50 on the one hand and the top edges 29 of the perimeter 28 and bows 48 on the other hand. In trailer 11, the pin 44 is not fixed to the front wall 22. Rather, pin 44 is engaged in a transverse slot 62 in a bracket 64 fixed to the front wall 22. This arrangement allows for both longitudinal and lateral displacement of the pivot 44 with respect to the perimeter 28.

Figure 3:
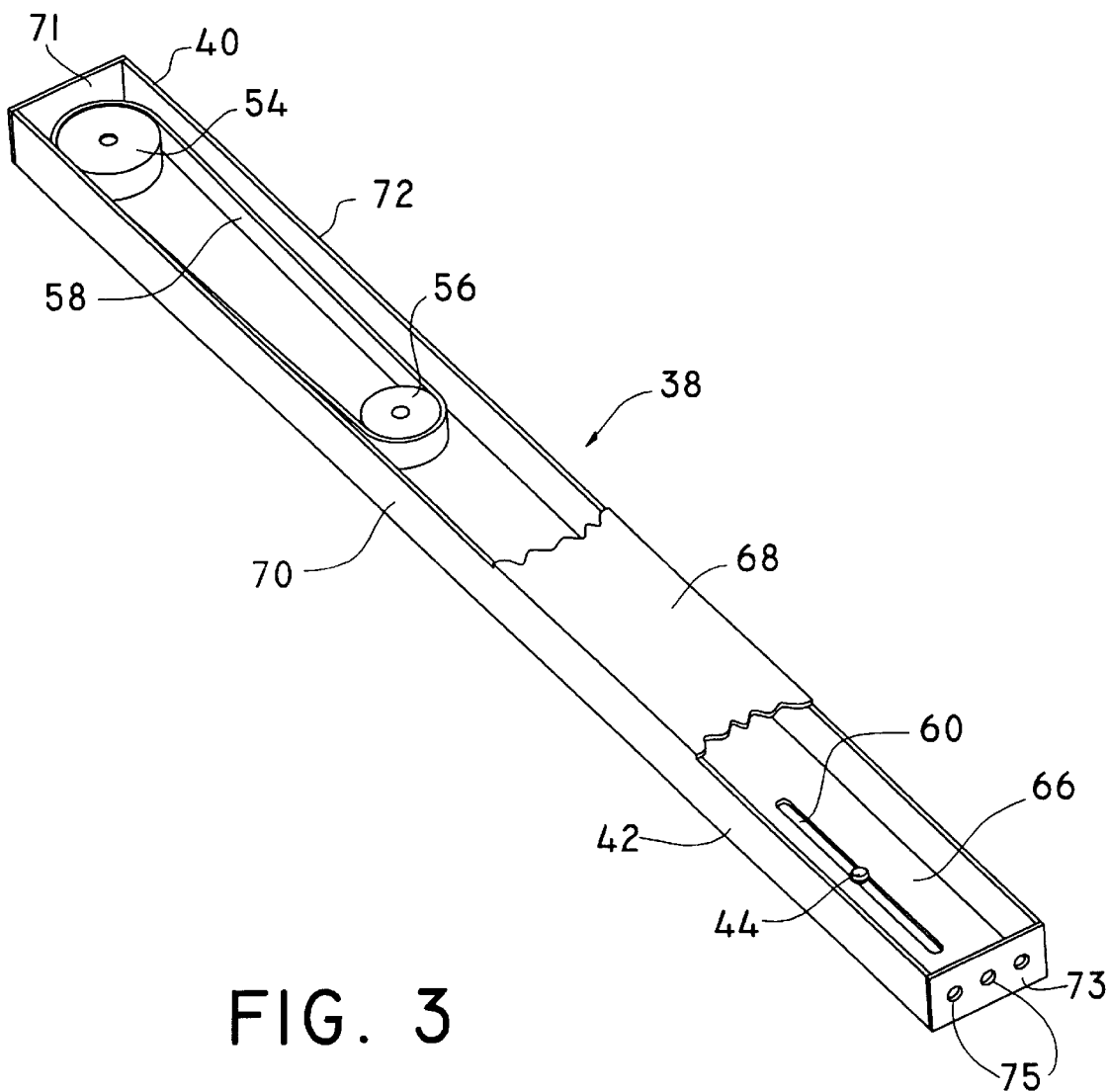
FIG. 3 is a detail perspective view of the arm, motor and pivot mechanism of the first embodiment of the present invention.

FIG. 3 is an enlarged detail of the arm 38 as previously described. It is to be noted that the arm 38 is formed as a box beam defined by an inner member 66 and an outer member 68 shown broken away at both the upper and lower ends. The inner member 66 and outer member 68 are joined together by side joining members 70 and 72 which, together, form the longitudinal box beam forming arm 38. The arm 38 also includes an upper end plate 71 for preventing moisture due to rain or snow from entering the box beam. The lower end of the arm 42 is also closed in part by a plate 73 that would include one or more apertures 75 to permit any moisture to gravitationally exit from the arm 38.

Figure 4:
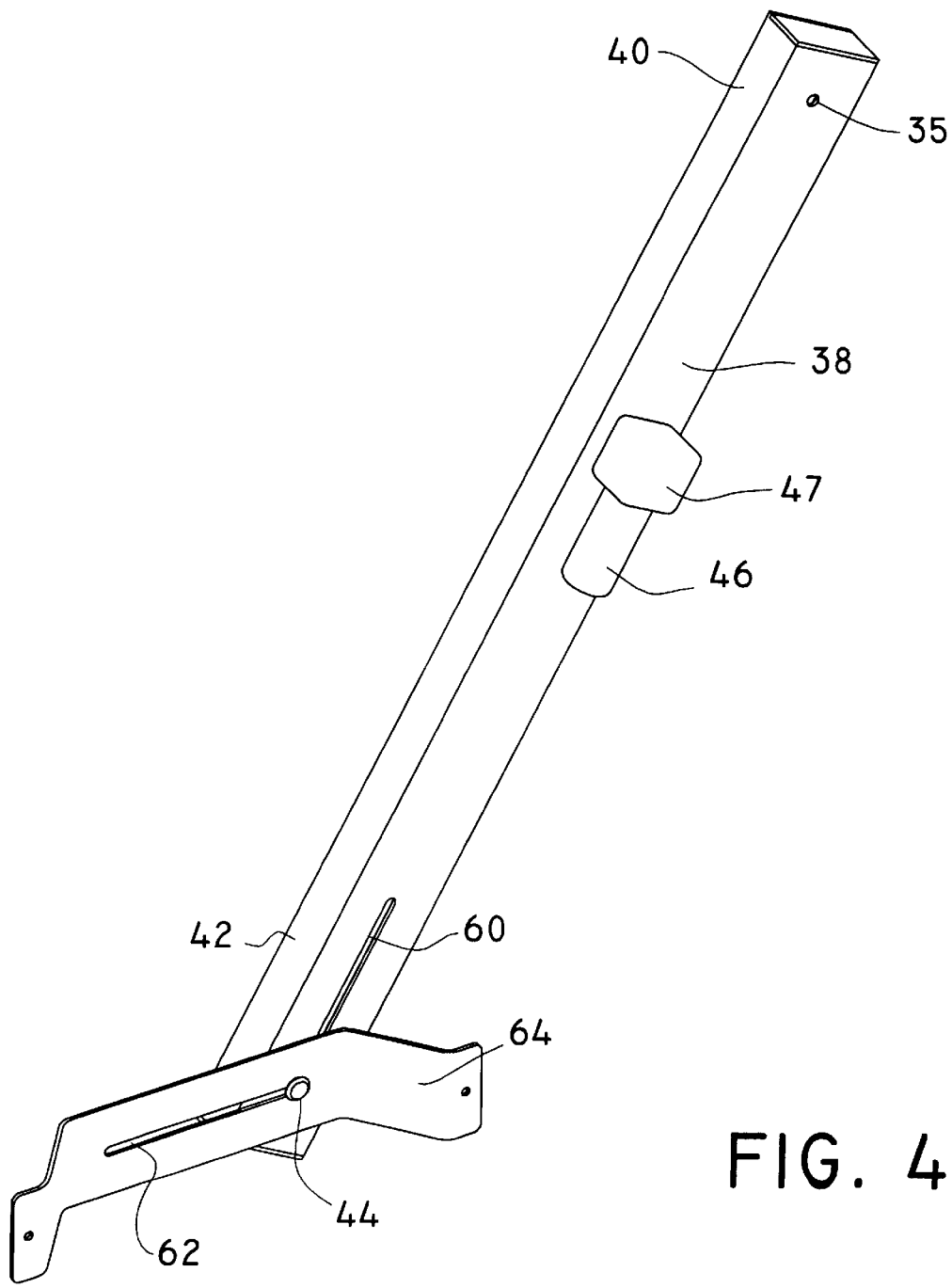
FIG. 4 is a detail perspective view of the arm, drive mechanism, and pivot bracket of the second embodiment of the present invention.

The arm 38 and bracket 64 from trailer 11, shown in FIG. 2, is illustrated in greater detail in FIG. 4. Arm 38 includes an aperture 35 adapted to receive end 34 of roller 32. While this can be a direct coupling, a stub shaft and coupling member can also be employed, the stub shaft being received in opening 35 to engage the upper pulley 54. The motor 46 is coupled to the lower pulley 56 by means of a right angle step down transfer gearbox 47. The gear ratios in the gearbox 47 are selected so that motor 46 is able to supply sufficient torque to the roller 32 to wind or unwind the flexible cover and thereby also move the arm 38 from one side to the other of the trailer. This motion is achieved through the friction between the roller 32 and the upper edges 29 of the ends 22 and 24 and bows 48. This necessitates that the roller firmly engages such surfaces through the radial or longitudinal motion of the arm by virtue of pin 44 sliding in slot 60. The lateral displacement of the arm, if necessary, can be achieved by having the pivot 44 engaged in the horizontal or transverse slot 62 in bracket 64 as shown in FIGS. 2 and 4.

Figure 5:
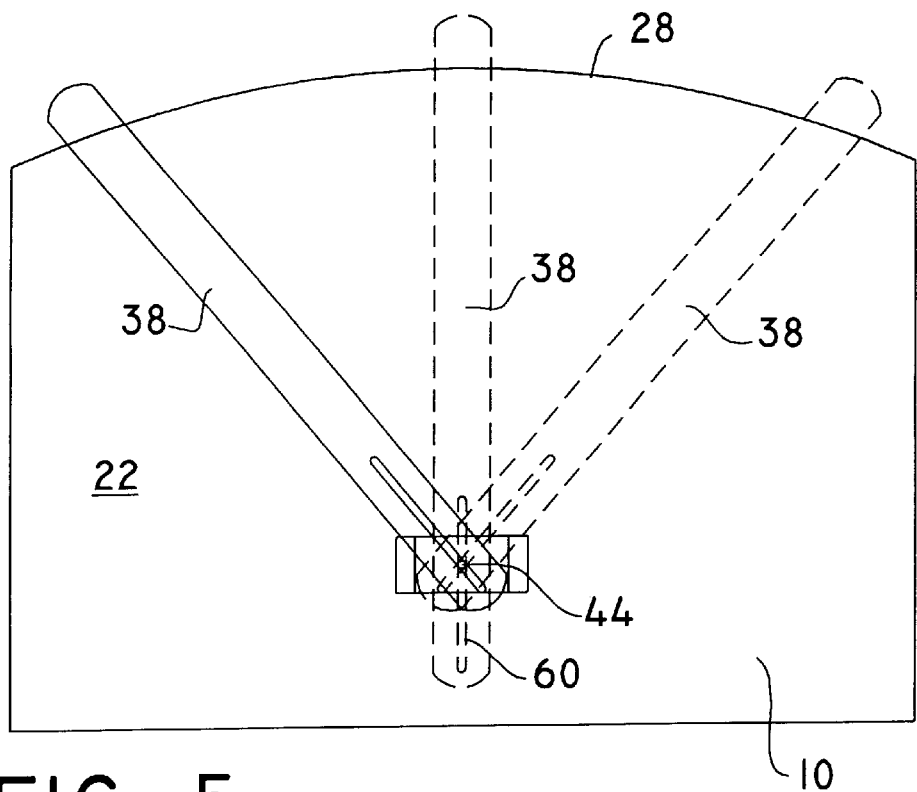
FIG. 5 is an end view of a load-carrying box employing the first embodiment of the present invention shown in three positions.
Figure 6:
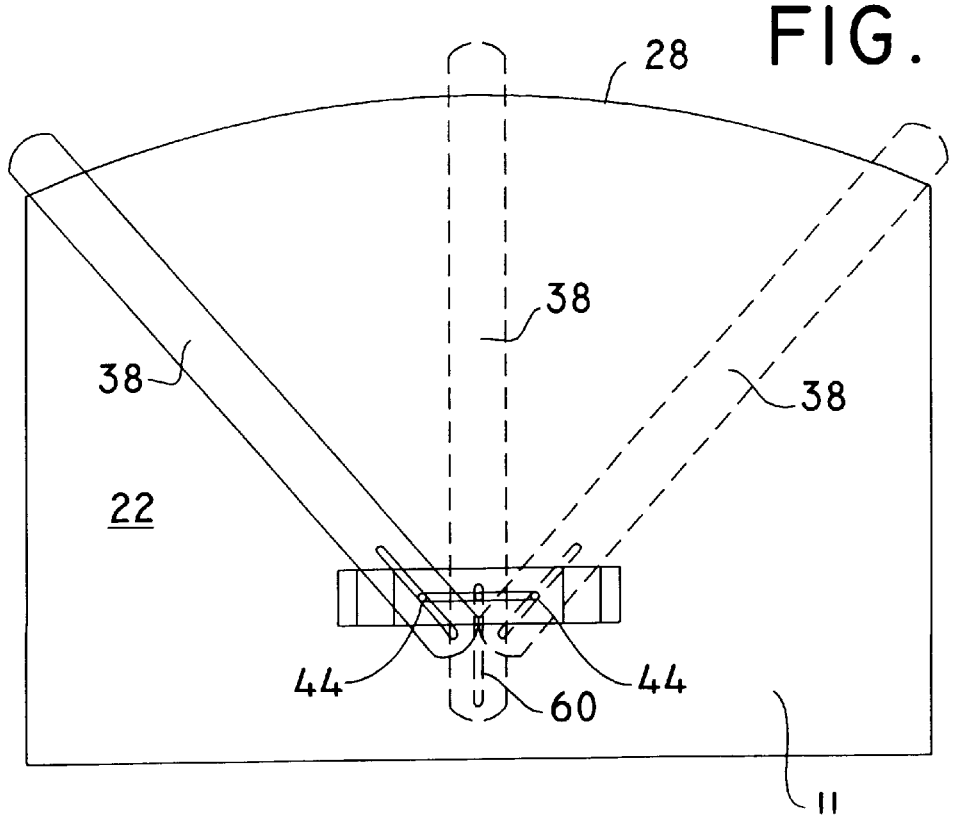
FIG. 6 is an end view of a load-carrying box employing the second embodiment of the present invention shown in three positions.

The difference between the two arm pivoting arrangements of trailers 10 and 11 are shown schematically in FIGS. 5 and 6. In FIG. 5, the pivot point defined by pin 44 remains at a fixed location on the front surface of end 22. As the arm 38 sweeps from one side to the other to either install or remove the flexible cover, the roller 32 follows the contour of the upper surface 29 causing the slot 60 to move relative to pin 44.

In trailer 11, a somewhat similar action is reflected, however, the pin 44 moves laterally from side-to-side within slot 62 as well as radially within slot 60 to facilitate the necessary range of motion of arm 38. The choice of which pin arrangement to employ will depend on the width and height of the trailer involved, and it may also depend upon the curvature of the upper surface 29.

While the present invention has been described with reference to the accompanying figures, it will be appreciated by those skilled in the art that other variations and modifications of the invention are possible within the scope of the following claims.

What is claimed is:

1. Apparatus for moving a flexible sheet cover with respect to a load-carrying box on a land vehicle, the box having a floor, a pair of parallel side walls extending upward from the floor, a front wall and a back wall extending upward from the floor, the front and back walls being coupled to the pair of side walls to form a generally rectangular container, the container having an upper perimeter defined by a top edge of each of the walls encompassing an open top, the flexible sheet cover having a first end secured adjacent a top edge of one of the walls and a second end movable by the apparatus, the apparatus comprising:

a roller attached to the second end of the flexible sheet cover, the roller having opposite ends projecting beyond the top edges of a selected two non-contiguous walls forming the load-carrying box; a motor coupled to the roller for rolling and unrolling the flexible sheet cover; an arm having a first end coupled to the roller and a second end, the arm including a slot; and a pin coupled to the load-carrying box and slidably engaged in the slot to define a pivot for the arm so that the roller can remain in constant contact with the top edges of the selected two non-contiguous walls forming the load-carrying box.

2. The apparatus of claim 1 further comprising a bracket fixed to the load-carrying box, the bracket including a lateral slot receiving said pin to provide for lateral movement of said pivot.

3. The apparatus of claim 1 wherein the arm comprises a box beam having an outer member, an inner member confronting the load-carrying box, and side joining members joining the outer member to the inner member, the inner member including said slot.

4. The apparatus of claim 1 further comprising a biasing spring having a first end fixed to the arm and a second end fixed to the load-carrying box to promote contact between the roller and the top edges of the selected two non-contiguous walls forming the load-carrying box.

5. The apparatus of claim 1 wherein the motor is fixed to the arm between the roller and the slot, and further comprising a drive unit coupling the motor to the roller.

6. Cover apparatus for use with a load-carrying box on a land vehicle, the box having a floor, a pair of parallel side walls extending upward from the floor, a front wall and a back wall extending upward from the floor, the front and back walls being coupled to the pair of side walls to form a generally rectangular container, the container having an upper perimeter defined by a top edge of each of the walls encompassing an open top, the apparatus comprising:

a flexible sheet cover having a first end secured adjacent a top edge of one of the walls and a second end; a roller attached to the second end of the flexible sheet cover, the roller having opposite ends projecting beyond the top edges of a selected two non-contiguous walls forming the load-carrying box; a motor coupled to the roller for rolling and unrolling the flexible sheet cover; an arm having a first end coupled to the roller and a second end, the arm including a slot; and a pin coupled to the load-carrying box and engaged in the slot to define a pivot for the arm so that the roller can remain in constant contact with the top edges of the selected two non-contiguous walls forming the load-carrying box as the flexible sheet cover is rolled on and off the open top.

7. The apparatus of claim 6 wherein the arm comprises a box beam of fixed length having an outer member, an inner member confronting the load-carrying box, and side joining members joining the outer member to the inner member, the inner member including said slot.

8. The apparatus of claim 7 wherein the motor is fixed to the arm between the roller and the slot, and further comprising a drive unit coupling the motor to the roller, the drive unit being enclosed within the box beam.

9. The apparatus of claim 8 further comprising a biasing spring having a first end fixed to the arm and a second end fixed to the load-carrying box to promote contact between the roller and the top edges of the selected two non-contiguous walls forming the load-carrying box.

10. The apparatus of claim 8 further comprising a bracket fixed to the load-carrying box, the bracket including a lateral slot receiving said pin to provide for lateral movement of said pivot.

11. The apparatus of claim 8 wherein the drive unit comprises a first pulley coupled to the motor, a second pulley coupled to the roller, and an endless band coupling the first and second pulleys together for substantially coordinated movement.

12. The apparatus of claim 8 wherein said selected two non-contiguous walls forming the load-carrying box constitute the front wall and the back wall, and the load-carrying box further comprises a plurality of bows coupling the tops of the two side walls together, the bows being generally parallel with the top edges of the front and back walls.

13. A load-carrying box on a land vehicle comprising: a floor, a pair of parallel side walls extending upward from the floor, a front wall and a back wall extending upward from the floor, the front and back walls being coupled to the pair of side walls to form a generally rectangular container, the container having an upper perimeter defined by a top edge of each of the walls encompassing an open top, a flexible sheet cover having a first end secured adjacent a top edge of one of the walls and a second end, a roller attached to the second end of the flexible sheet cover, the roller having opposite ends projecting beyond the top edges of a selected two non-contiguous walls forming the load-carrying box, a plurality of bows positioned in spaced parallel relation to the top edges of the selected two non-contiguous walls across the open top, the bows having ends coupled to another two of the walls forming the load-carrying box, a motor coupled to the roller for rolling and unrolling the flexible sheet cover along the bows and the top edges of a selected two non-contiguous walls, an arm having a first end coupled to the roller and a second end, the arm including a slot, and a pin coupled to the load-carrying box and engaged in the slot to define a pivot for the arm so that the roller can remain in constant contact with the top edges of the selected two non-contiguous walls box and the bows as the flexible sheet cover is rolled on and off the open top.

14. The load-carrying box of claim 13 wherein the arm comprises a box beam of fixed length having an outer member, an inner member confronting the load-carrying box, and side joining members joining the outer member to the inner member, the inner member including said slot.

15. The load-carrying box of claim 14 wherein the motor is fixed to the arm between the roller and the slot, and further comprising a drive unit coupling the motor to the roller, the drive unit being enclosed within the box beam.

16. The load-carrying box of claim 15 further comprising a biasing spring having a first end fixed to the arm and a second end fixed to the load-carrying box to promote contact between the roller and the top edges of the selected two non-contiguous walls forming the load-carrying box.

17. The load-carrying box of claim 16 further comprising a bracket fixed to the load-carrying box, the bracket including a lateral slot receiving said pin to provide for lateral movement of said pivot.

18. The load-carrying box of claim 17 wherein the drive unit comprises a first pulley coupled to the motor, a second pulley coupled to the roller, and an endless band coupling the first and second pulleys together for substantially coordinated movement.

19. The load-carrying box of claim 18 wherein the endless band coupling the first and second pulleys is a belt.

20. The load-carrying box of claim 18 wherein the endless band coupling the first and second pulleys is a chain.

* * * * *